F. COLLINS.
Car-Wheel Gages.
No. 154,457. Patented Aug. 25, 1874.
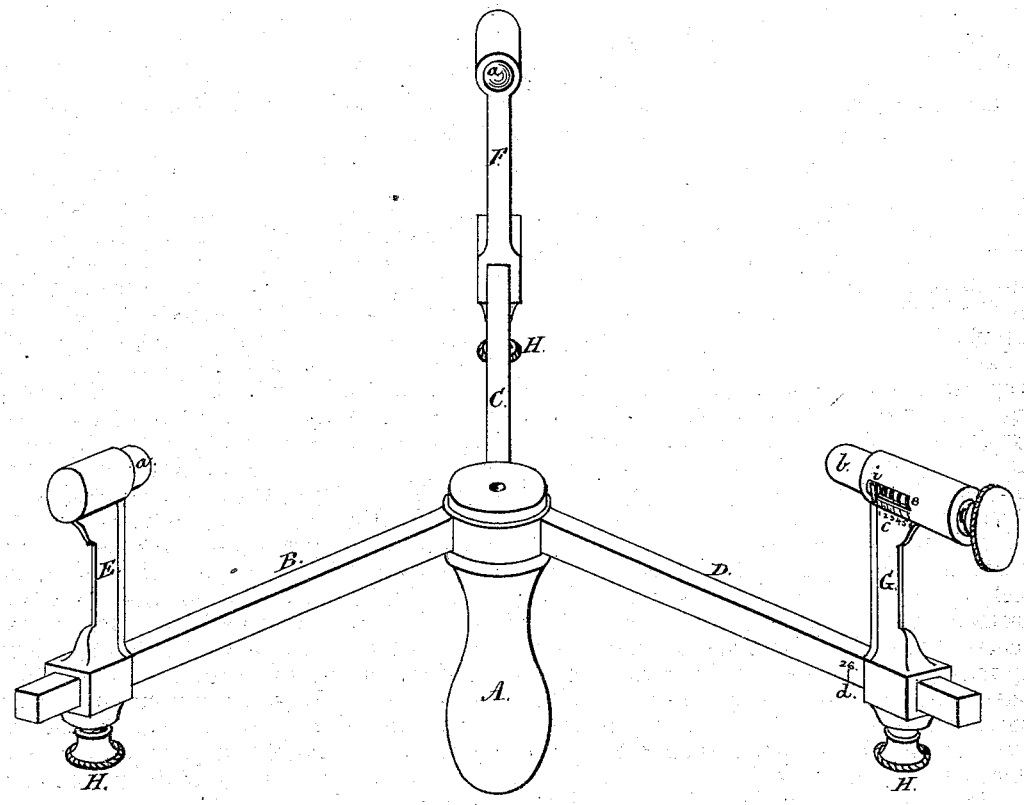

UNITED STATES PATENT OFFICE.

FREDRICK COLLINS, OF ELKHART, INDIANA.

IMPROVEMENT IN CAR-WHEEL GAGES.

Specification forming part of Letters Patent No. 154,457, dated August 25, 1874; application filed January 26, 1874.

*To all whom it may concern:*

Be it known that I, FREDRICK COLLINS, of Elkhart, county of Elkhart, State of Indiana, have invented an Improvement in Gages for Car-Wheels, of which the following is a specification:

Cast-metal car-wheels, even when molds are prepared from the same pattern, will vary slightly in size, say from one-eighth to three-eighths of an inch, owing to the difference in the density with which the sand is tamped, and the differences in the temperature at which the metal is poured.

It is important that car-wheels intended to be attached to the same axle should be precisely of the same diameter; therefore, an instrument for measuring with precision the diameter of the wheel becomes a desideratum. My improved gage attains this result, and its construction is clearly represented in the accompanying drawing, showing a perspective view thereof. It consists of a handle, A, from which, as a center, radiate three arms, B C D, placed at an angle of one hundred and twenty degrees from each other. On these arms, respectively, move the slides E F G, which can be fixed at any point on said arms by means of set-screws H. In the heads of slides E F are the fixed points or buttons $a$ $a$. The head of the slide G is provided with a sliding rod, $b$, which is pressed in a direction toward the center of the instrument by means of a spiral spring, $s$, inclosed in the slide-head. Slide $b$ is provided with an index, $i$, which indicates upon a scale marked upon the outside of the slide-head the distance to which the slide $b$ has been driven back. Graduations are made on the ends of the arms B C D, which graduations correspond with each other, and indicate the distance from the center of the instrument which the points $a$ $a$ and $b$ occupy when a wheel of given diameter is inserted in the instrument. For example, let us suppose that all the wheels cast from a certain pattern are intended to be thirty inches in diameter. In order to gage these wheels with this instrument the slides E F G would be set at the figure 30 of their respective graduated scales. If a wheel of thirty inches in diameter be placed in the instrument its periphery will touch the three points $a$ $a$ and $b$, and will not press back the slide $b$; but if the wheel be of greater diameter than thirty inches, it will press back the slide $b$, and the excess of diameter will be indicated by the index $i$ on the scale marked upon slide G. By marking upon the wheel itself its normal diameter by the figure 30, and adding a figure to show the excess indicated by the index $i$, we shall have an exact measure of the diameter of each wheel, and a ready means of arranging the wheels in pairs for use on the same axle, or to be applied in replacing a broken wheel.

I claim—

1. The device for indicating variations of diameter, consisting of a radially-adjustable slide-piece and a spring-slide indicator, substantially as described.

2. The combination of the radial gage-arms, the gaging-slides, the spring-slide indicator, and clamping-screws, all constructed to operate in combination, substantially as set forth.

The above specification of my said invention signed and witnessed at Elkhart, Indiana, this 12th day of June, A. D. 1873.

FREDRICK COLLINS.

Witnesses:
JOHN A. RICHLEY,
J. R. MATHER.